United States Patent
Demott et al.

(10) Patent No.: US 7,491,438 B2
(45) Date of Patent: Feb. 17, 2009

(54) NEEDLED NONWOVEN TEXTILE COMPOSITE

(75) Inventors: Roy Phillip Demott, Spartanburg, SC (US); Tim Meade, Duncan, SC (US); Jim Porterfield, Greenville, SC (US)

(73) Assignee: Milliken & Company, Spartanburg, SC (US)

( * ) Notice: Subject to any disclaimer, the term of this patent is extended or adjusted under 35 U.S.C. 154(b) by 742 days.

(21) Appl. No.: 10/617,923

(22) Filed: Jul. 11, 2003

(65) Prior Publication Data

US 2005/0008813 A1    Jan. 13, 2005

(51) Int. Cl.
  *B32B 27/12* (2006.01)
  *D04H 1/00* (2006.01)
  *D04H 1/46* (2006.01)
  *D04H 1/48* (2006.01)
  *D04H 11/00* (2006.01)
  *D04H 11/08* (2006.01)

(52) U.S. Cl. .................. 428/95; 442/394; 442/402; 442/403; 442/407; 442/414; 442/415; 428/96

(58) Field of Classification Search .................. 428/95, 428/91, 92, 96, 97; 442/394, 402, 403, 407, 442/414, 415, 85, 88, 93, 94
See application file for complete search history.

(56) References Cited

U.S. PATENT DOCUMENTS

| | | | |
|---|---|---|---|
| 2,786,790 A | 3/1957 | Klein et al. | |
| 3,496,054 A | 2/1970 | Baigas | |
| 5,216,790 A | 6/1993 | Eschenbach | |
| 5,662,978 A | 9/1997 | Brown et al. | |
| 5,672,222 A | 9/1997 | Eschenbach | |
| 5,747,392 A | 5/1998 | Xiao et al. | |
| 5,874,148 A | 2/1999 | Hough et al. | |
| 5,879,614 A | 3/1999 | Harrison | |
| 5,899,783 A | 5/1999 | Kimbrell, Jr. et al. | |
| 5,902,753 A | 5/1999 | DeMott et al. | |
| 6,024,823 A | 2/2000 | Rubin et al. | |
| 6,100,208 A | 8/2000 | Brown et al. | |
| 6,136,730 A * | 10/2000 | Kimbrell et al. | 442/62 |
| 6,139,675 A | 10/2000 | Druecke et al. | |
| 6,191,057 B1 | 2/2001 | Patel et al. | |
| 6,492,001 B1 * | 12/2002 | Rubin et al. | 428/137 |
| 6,514,889 B1 * | 2/2003 | Theoret et al. | 442/320 |
| 6,541,402 B1 * | 4/2003 | Kimbrell et al. | 442/62 |
| 6,677,258 B2 * | 1/2004 | Carroll et al. | 442/394 |
| 6,769,146 B2 * | 8/2004 | Copeland et al. | 5/653 |
| 6,818,253 B2 * | 11/2004 | Kimbrell | 427/393.4 |
| 6,833,335 B2 * | 12/2004 | DeMott et al. | 442/94 |
| 2001/0021616 A1 * | 9/2001 | Bullock et al. | 442/76 |
| 2002/0019183 A1 * | 2/2002 | Demott et al. | 442/85 |
| 2003/0008585 A1 * | 1/2003 | Rubin et al. | 442/286 |
| 2003/0181113 A1 * | 9/2003 | Demott et al. | 442/76 |
| 2004/0058603 A1 * | 3/2004 | Hayes | 442/286 |
| 2004/0102113 A1 * | 5/2004 | DeMott et al. | 442/64 |

* cited by examiner

*Primary Examiner*—Cheryl Juska
(74) *Attorney, Agent, or Firm*—John E. Vick, Jr.; Cheryl J. Brickey

(57) ABSTRACT

A layered textile composite product is disclosed which may include a nonwoven needled layer. The nonwoven needled layer is comprised of mechanically interlocked staple fibers which are needled together on a needle punch machine and then bonded with an adhesive layer to a polymeric or polyolefin film layer. The overall layered textile product may be used in several different applications, including for example in automobiles for seating, load floor, trunk linings, floor carpeting, door panel trim, and other interior trim applications.

36 Claims, 3 Drawing Sheets

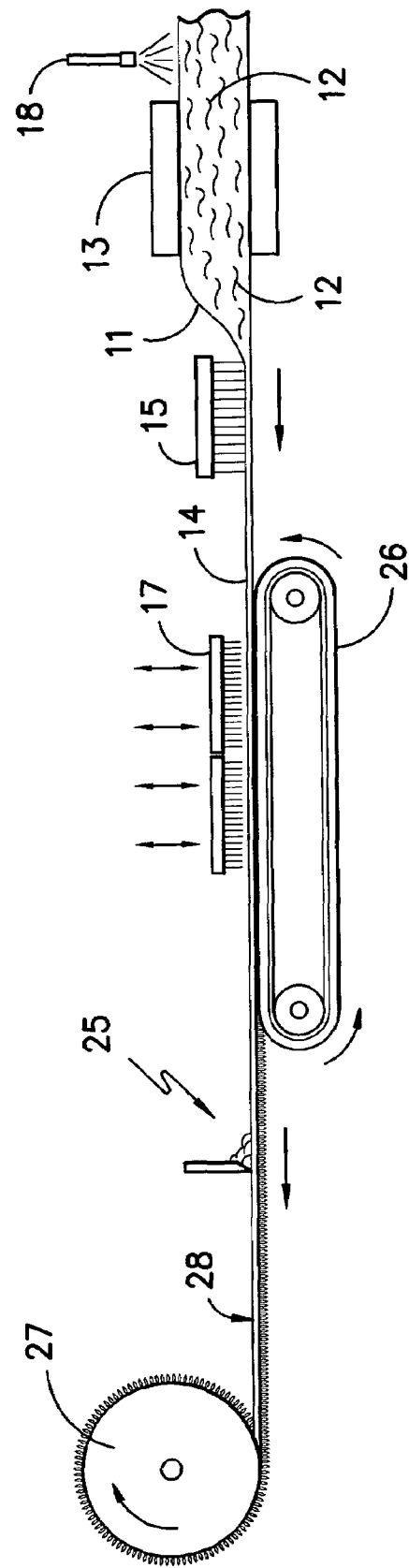
Figure -1-

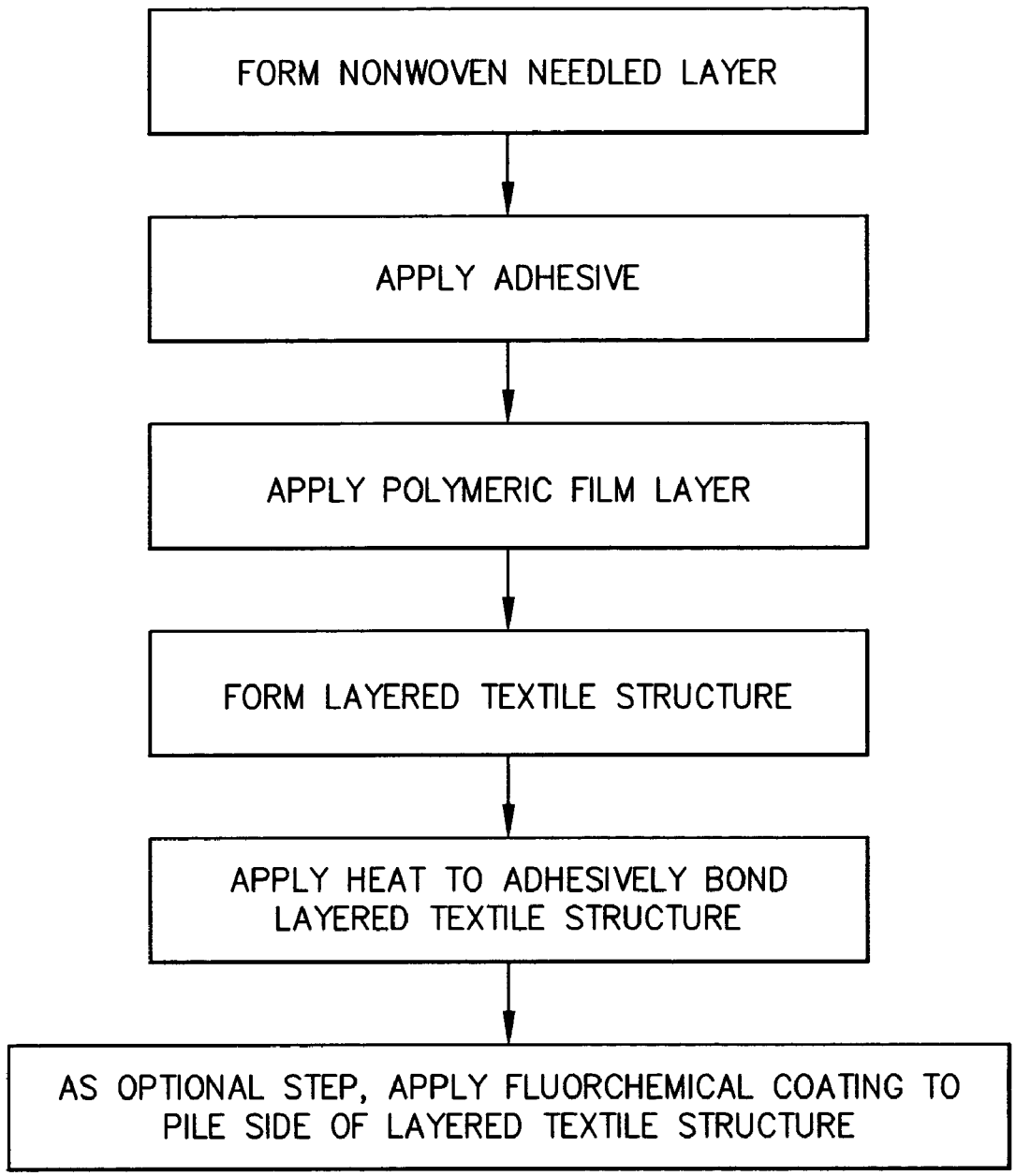
Figure −2−

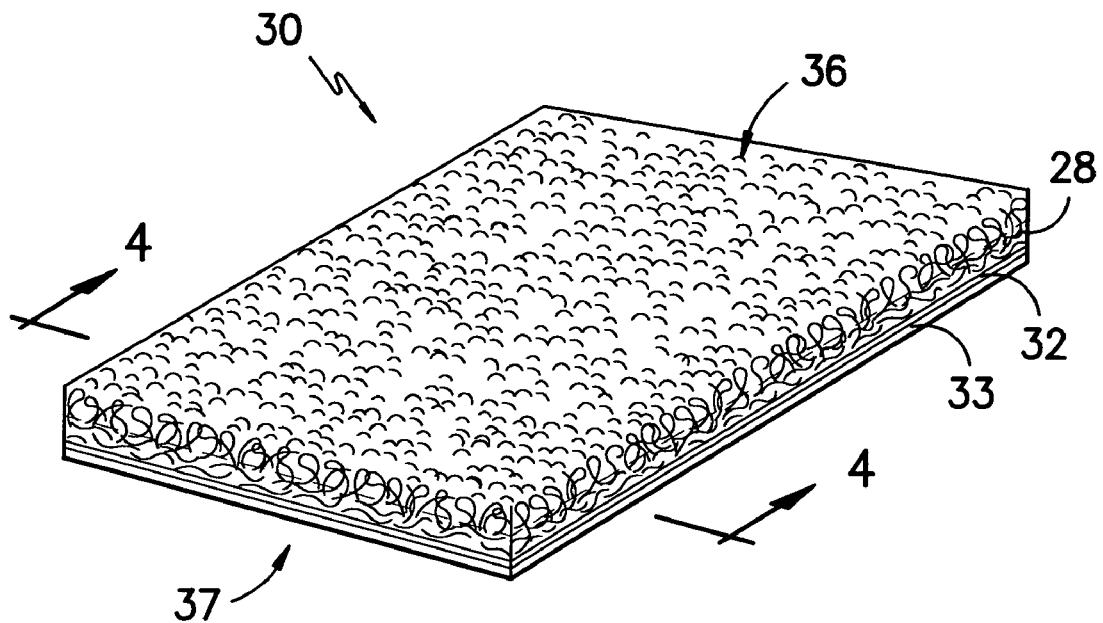
Figure -3-
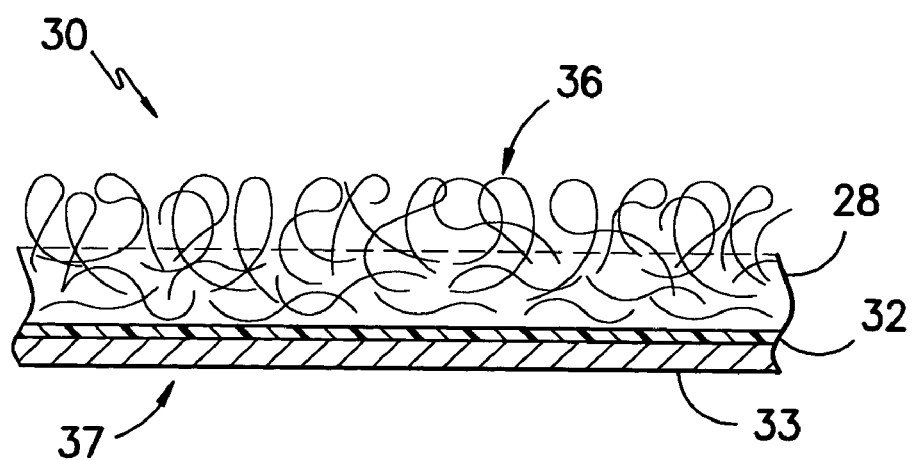
Figure -4-

NEEDLED NONWOVEN TEXTILE COMPOSITE

BACKGROUND OF THE INVENTION

Modern automobiles are used for family transportation, industrial work applications, and weekend outdoor sports activities. Materials used in automobiles for seating, load floor applications, trunk linings, package trays, floor carpeting, door panel trim, and interior trim applications must be pleasing to consumers. Such materials must be attractive, soft, and resist soiling and water damage. Further, such materials must be durable to abrasion for extensive use.

A common material used in modern automobiles for such applications is nonwoven material. Some of these materials are formed by a needle punching, or "needling" process, in which a large batch of raw fibers are loaded into a machine and then fed to a carding apparatus. The fibers are oriented and laid together to form a plane. The fibers are punched with numerous needles. The needles include barbs so that each time needles enter the fabric plane, they carry fibers from the outside to the inside. In this way, fibers can be formed into an integrated nonwoven fabric. In some applications, a pile is applied to one or more sides of the fabric, to provide a soft texture, which makes the fabric desirable for product applications that will receive human touch or contact, such as automotive trim applications.

There is a continuing need in the design of modern automobiles to provide water resistance in those portions of the automobile which receive significant amounts of wet contact or wet cargo. Furthermore, it is an important safety factor to provide materials for automotive (or non-automotive) use which are flame retardant, and will not readily burn. Also, many manufacturers request that materials used for such applications be recyclable, or otherwise environmentally benign.

SUMMARY OF THE INVENTION

In the invention, a textile product and method of making a textile product are disclosed. The product provides, in one embodiment, a layered textile composite having a pile. In other embodiments, the product provides a non-pile flat felt finish. The textile employs a nonwoven needled layer comprised of mechanically interlocked staple fibers.

In the pile-containing embodiment, the nonwoven needled layer includes a first pile-containing side and a second side which is opposite the first pile-containing side. An adhesive layer is disposed adjacent to the second side of the nonwoven needled layer. A polymeric film layer is bonded to the adhesive layer.

BRIEF DESCRIPTION OF THE DRAWINGS

A full and enabling disclosure of this invention, including the best mode shown to one of ordinary skill in the art, is set forth in this specification. The following Figures illustrate the invention:

FIG. 1 is a schematic representation of a process employed to produce a nonwoven needled layer;

FIG. 2 shows a flow diagram of the process of making the layered textile construction of the invention; and FIG. 3 depicts a perspective view of one embodiment of the invention having a pile-containing side;

FIG. 4 shows the embodiment of FIG. 3 in cross-section, as taken along line 4-4 of FIG. 3.

DETAILED DESCRIPTION OF THE INVENTION

Reference now will be made to the embodiments of the invention, one or more examples of which are set forth below. Each example is provided by way of explanation of the invention, not as a limitation of the invention.

A needle punched nonwoven layered textile composite material may be produced by attaching a polymeric film to a nonwoven layer. In some applications, a flame retardant polymeric film may be employed, including for example a flame retardant thermoplastic polyurethane film. The nonwoven layer may be bonded to the film by applying a web of heat activated polyester adhesive web.

In one application of the invention, a polyurethane film may be used, which comprises an aromatic polyether. The flame retardant composition that may be used in such a film may be either a halogenated or non-halogenated compound.

The polyester adhesive web can be heat activated and inserted between the nonwoven layer and the film layer to bond the film layer to the nonwoven layer.

In one application of the invention, polypropylene or polyester staple fibers are employed in the manufacture of the nonwoven layer, and this layer may be either flat felt or may include a pile. The nonwoven layer may be treated with a topical flame retardant, may be extruded with the fibers, or may be provided in the latex. Some applications of the invention include a topical coating or treatment of a fluorochemical, which may be added to the pile side of the nonwoven layer to improve cleanability and enhance water resistance.

In one application of the invention, there is no pile on the surface of the needled nonwoven layer, and instead the nonwoven needled layer provides a flat felt texture on its surface. Thus, it is not required that there be a pile in the practice of the invention. A flat felt texture or finish can be useful as it often is more economical to produce, and may be ideal for various applications, including for example as a trunk liner of an automobile.

An applicator 18 (in one particular embodiment of the invention) may provide a flame retardant or lubricant composition to the staple fiber 12. FIG. 1 illustrates one form of the nonwoven layer. Staple fibers 12 are laid up in a continuous web 11, as in FIG. 1, using for instance a conventional lapper 13. The web 11 is advanced past a needle loom 15 and is needled into a continuous batt 14 using needles. The batt 14 may be needled from both sides or from one side, and further may be needled with a series of needle looms 15, or simultaneously by multiple needle looms 15 (multiple looms not shown in FIG. 1). The actual configuration employed can vary. The needled bat 14 may be selectively turned and/or advanced by conveyor 26. Further, the batt 14 can be needled from either side in loom 17. Such needling equipment is available from Dilo Machinensystem GmbH, Inc. of Germany, and also from Fehrer AG. of Austria.

In at least one application of the invention, it is desirable to use an applicator 25 as shown in FIG. 1. The applicator 25 is a commercially known applicator that is capable of applying liquids to the batt 14 in a contact application or in a spray application. A chemical composition (i.e. a flame retardant, antistatic agent, repellent, soil release agent) is applied to batt 14. In some cases, the nonwoven needled layer comprised of batt 14 receives a spray or a liquid application of a binder material at the applicator 25. Furthermore, the binder material may comprise an acrylic latex material, in some applications. In other applications, the binder material applied by the applicator 25 may include a flame retardant composition. In some cases, such a flame retardant composition may include a bromine-containing or a phosphorous-containing flame retardant composition. Examples of such bromine containing or phosphorous containing flame retardant materials that could be employed by the applicator 25 include Bromine Apex Flameproof 333® and Apex Flameproof 344® manufactured by Apex Chemical Company; and also phosphorous-containing materials such as cyclic phosphonates, including Anti-Blaze NT® from the Rhodia Chemical Company.

From the applicator 25 the batt 14 is provided to a take up roll 27, which stores the nonwoven needled layer until it can be further processed as further described below. In other applications, it may be possible to directly feed the batt 14 of nonwoven needled layer to a second operation which applies an adhesive layer and a polymeric film layer as further described below, without an intervening storage step.

In general, the nonwoven needled layer 28 shown in FIG. 1 may be comprised of mechanically interlocked staple fibers. In one embodiment, the nonwoven needled layer 28 includes a first pile-containing side 36 shown in FIG. 3, and a second side which does not contain pile (second side 37 shown in FIG. 3)(sometimes called the "back" side). Thus, FIG. 3 shows the resulting layered textile product formed according to the procedure outlined in FIG. 2, described below.

In FIG. 2, the nonwoven needled layer 28 which is formed according to the process of FIG. 1 receives the application of an adhesive web to form a textile construction 30 as shown in FIGS. 3-4. That is, in some cases an adhesive web or layer may be applied in a manufacturing operation between a polymeric film layer and the nonwoven needled layer 28 so that a sandwich is formed which comprises as its uppermost layer a nonwoven needled layer, as its middle layer an adhesive web, and as its lower layer a polymeric film. In other applications a liquid adhesive could be employed, instead of a solid web. In any event, the layered textile product produced would have a nonwoven needled layer 28 which is applied to a polymeric film layer by an adhesive therebetween which bonds the nonwoven needled layer to the polymeric film layer. A representative example of an adhesive web 32 is shown in FIG. 3 and FIG. 4. Furthermore, a representative example of a polymeric film layer 33 may be seen in FIGS. 3-4.

It is possible in subsequent manufacturing operations to apply heat to adhesively bond the layered textile structure. In some applications, the heat could be applied by a heater which applies convection heat. Other applications could employ a heated calendering roll to heat and adhesively bond the nonwoven needled layer 28 to the polymeric film layer 33. Thus, the layered textile construction 30 shown in FIGS. 3-4 may be formed by various methods of manufacture.

In at least one application of the invention, the staple fibers which are employed in the nonwoven needle layer 28 are comprised of a fiber selected from the group of fibers consisting of polyester and polypropylene. Other examples of fibers which could be employed include nylon, polyethylene, polyamides, high density polyethylene, linear low density polyethylene, polytetraethylene, aramids such as Nomex® and Kevlar®, rayon, acetates, acrylics, olefins, polytetrafluoroethylene (PTFE), polyethylene terephalate (PET), isophthalate modified PET, glycol modified PET, polylactic acid (PLA), and others.

In some applications, the fibers could comprise a blend of fibers, such as for example a blend of polyester and polypropylene fibers. One advantage of providing a fiber blend is that it may afford the opportunity to employ fibers having differing melting points, wherein the lower melting point fibers may be activated by heat to bond the structure together.

In one application of the invention, the weight of the nonwoven needle layer 28 may be between about 5 and about 20 ounces per square yard. The nonwoven needled layer 28 may be resistant to abrasion, and may provide superior lightfastness properties. Furthermore, it is desirable that the nonwoven needled layer 28 provide for manufacturing applications in which it will not release or evaporate substances into the interior of an automobile which would cause undesirable fogging of the interior glass in an automobile.

The fibers to be employed may be fibers of essentially any type, but it is known that 1.5-4 inch staple fibers which are synthetic in nature perform well in the application of the invention. The layered textile composite 30 which is formed in the practice of the invention may be resistant to moisture and may act as a moisture or water barrier that facilitates the cleaning of the layered textile 30 when it is used in an automobile interior trim application. For example, the use of the layered textile composite 30 on the load floor or interior portion of a vehicle may allow for the cleaning with water without damaging the vehicle due to the water barrier formed by use of the polymeric film layer 33. Furthermore, it is possible to use a topical flouro chemical coating which may be a added to the top surface 36 of the layered textile product 30 as an optional treatment. As described in FIG. 2, this optional step would include the application of a flourochemical coating upon the first side 36 of the layered textile structure 30, shown in FIGS. 3-4. There are several methods would may be used to apply a fluorochemical coating, including padding, spraying, or rolling a coating to the first side 36 to the layered textile construction 30.

One example of fluorochemical agent that could be employed would be a fluoropolymer. Fluoropolymers may be stain release agents as well. Compounds of this type could include, for example, REPEARL® F8025 and REPEARL® F-89, both available from Mitsubishi Corp., as well as ZONYL® 7713, available from DuPont Chemical Company of Wilmington Del. Treatment of a substrate with a hydrophobic stain repellency agent generally results in a surface that exhibits a low surface energy. Essentially any type of repellancy agent or fluorochemical could be used in the practice of the invention.

A binder material may be employed in other applications of the invention. For example, a binder acts to hold the fibers together within the nonwoven needled layered 28. Such a binder material could be blended with the stable fibers, and for example could include lower melt polyethylene fibers which melt clear and shrink down to stabilize and strengthen the nonwoven needled layer 28. This, for example, could include heat set 2 inch long polyethylene fibers, which could for example be applied at about 5-20% by weight polyethylene fibers.

In another application of the invention, a latex binder could be employed in which an acrylic co-polymer is used with a bromine-containing or a phosphorus-containing material to be applied as a flame retardant coating applied by applicator 25 shown in FIG. 1. Thus, as a second method of employing binder material, instead of using low melt fibers, an acrylic co-polymer composition could be sprayed using the applicator 25 directly upon the surface of the nonwoven needled layer 28. Other applications could employ a spray or roll-on of a similar composition which acts to bind the nonwoven needled layer 28 to form a structurally stable layer. Such compositions could be applied at a rate of about 1 to 2 ounces per square yard, or in other applications at a rate of about 4 to 12 ounces per square yard. In some applications of the invention, polymeric compositions applied at a rate of between about 1 and 5 ounces per square yard would be desirable. Furthermore, a flame retardant composition could be applied of a rate of between about 1 and 12 ounces per square yard of material.

With regard to the adhesive web or adhesive layer 32 shown in FIGS. 3-4, several types of adhesive could be employed. For example, synthetic adhesives could be used which would increase the recyclability of the overall product. In some applications, a polyester adhesive could be used, which could be applied as a solid web and then is later heated to dissolve and bond the nonwoven needled layer 28 to the polymeric film layer 33.

The adhesive layer 32 could comprise a product known as PE-120® which is manufactured by the Bostik Corporation. This particular adhesive is a polyester adhesive including a B&R melting point of about 268° F., and a DSC melting point of about 240° F. This polyester adhesive provides a heat resistance of about 500 grams per square inch, at a temperature of about 248° F. It provides a dry heat activation of 270-290° F. It is available in gram weights of between 15 and 150 grams per square yard. It is believed to be available in widths of up to about 72 inches. Other types of adhesives could be employed as well, and the invention is not limited to any specific type of adhesive to be employed as the adhesive material.

With regard to the polymeric film layer 33, many different types of synthetic or polymeric film could be employed. In one application of the invention, a polyurethane film could be used. One polyurethane film which is believed to be quite useful in the application of the invention is a product known as Dureflex®, manufactured by Deerfield Urethane Company, a Bayer Company. The Dureflex® product line includes PT9101® which is an aromatic polyether. This material has a flame retardant which includes a halogen/mineral, and is white in color. A second product manufactured my Deerfield Urethane is a product designated PT9700® which is an aromatic polyether non-halogenated product. It is clear in color, and provides good adhesive properties. A third product manufactured by Deerfield Urethane which may be employed in the invention is PS8601®, an aromatic polyester that is a halogenated/mineral material. It is white in color.

The properties of the above three products manufactured by Deerfield Urethane which may be employed in the application of the invention are provided below in Table 1.

TABLE 1

Flame Retardant Aromatic Type Thermoplastic Polyurethane Film and Sheet Products

| Typical Property | PT9101 | PT9700 | PS8601 |
|---|---|---|---|
| Polymer Type | Aromatic Polyether | Aromatic Polyether | Aromatic Polyester |
| Flame Retardant Type | Halogen/Mineral | Non-Halogen | Halogen/Mineral |
| Color | White | Clear | White |
| Hardness (Shore A) | 87 | 85 | 97 |
| Specific Gravity | 1.24 | 1.20 | 1.28 |
| 100% Modulus (MD/CD Avg) | 1000 | 600 | 1400 |
| 300% Modulus (MD/CD Avg) | 1900 | 1000 | 2200 |
| Ultimate Tensile | 7800 | 7000 | 6500 |
| Ultimate Elongation | 650 | 800 | 525 |
| Tear Strength | 475 | 400 | 550 |
| Processing Range | 375-400 | 375-400 | 375-400 |
| Obtained Range against UL 94 VTM | VTM VO | VTM VO | VTM VO |
| Yield | 145 | 159 | 140 |

In general, the above referenced materials provide good low temperature flexibility, and good abrasion resistance. These adhesives may be bonded to a wide variety of substrates, and generally work well in a practice of the invention to be bonded to the second side 37 of the nonwoven needled layer Other types of the polymeric film layer 33 could be employed in the invention. Essentially any polymeric material which provides a film that is capable of acting as a water barrier and undergoing adhesive bonding to the nonwoven needled layer 28 may be employed.

In some applications of the invention it has been found that the polymeric film layer 33 may be of a thickness which is less than about 10 mils. In one particular embodiment of the invention, a film having a thickness of less than about 3 mils is applied.

In one application of the invention, a back coating layer may be applied to the nonwoven needled layer 28. In such applications, the back coating layer may include as well a flame retardant material, such as those previously described or others.

In one application of the invention, a textile is provided which comprises a nonwoven needled layer 28, comprised of polymeric fibers. The polymeric fibers may include fibers which are selected from polyester stable fibers or polypropylene stable fibers, with the nonwoven needled layer 28 having a first pile-containing side 36 and a second side 37 opposite the first pile-containing side 36. Furthermore, a polyester-based adhesive layer may be applied to the second side of the nonwoven needled layer 28. Then, a polyurethane-based film layer is bonded to the nonwoven needled layer 28 by the use of adhesive. In some cases, the polyurethane-based film layer may include a flame retardant as well. Other applications of the invention could employ a fluorochemical coating upon the first pile containing side of the nonwoven needled layer 28.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A layered textile composite having a pile, the composite comprising:
   (a) a nonwoven needled layer, said nonwoven needled layer being comprised of mechanically interlocked staple fibers, said nonwoven needled layer having a first pile-containing side and a second side opposite said first side;
   (b) a binder material applied to said second side of said nonwoven needled layer, said binder material comprising an acrylic latex binder,
   (c) an adhesive layer adjacent said second side of said nonwoven needled layer; and
   (d) a polymeric film layer adjacent said adhesive layer.

2. The textile composite of claim 1 wherein said staple fibers are comprised of at least some fibers selected from the group of fibers consisting of: polyester, polypropylene, nylon, polyethylene, polyamides, high density polyethylene, linear low density polyethylene, polytetrafluoroethylene (PTFE), aramids, rayon, acetates, acrylics, olefins, polyethylene terephthalate (PET), isophthalate modified PET, glycol modified PET, and polylactic acid (PLA).

3. The textile composite of claim 1 wherein said fibers comprise polyester fibers.

4. The textile composite of claim 1 wherein said fibers comprise polypropylene fibers.

5. The textile composite of claim 1 wherein said fibers comprise a blend of polyester and polypropylene fibers.

6. The textile composite or claim 1 in which the weight of the nonwoven needled layer is between about 5 and about 20 ounces per square yard.

7. The textile composite of claim 1 wherein said binder material further comprises a flame retardant composition.

8. The textile composite of claim 7 wherein said flame retardant material is provided in said nonwoven needled textile at a concentration of between about 1 and about 12 ounces per square yard.

9. The textile composite of claim 1 in which said fibers contain a flame retardant material.

10. The textile composite of claim 9 wherein said flame retardant material comprises a bromine-containing composition.

11. The textile composite of claim 9 wherein said flame retardant material comprises a phosphorous-containing composition.

12. The textile composite of claim 1 wherein said adhesive comprises a polyester adhesive.

13. The textile composite of claim 1 wherein said polymeric film comprises a polyurethane film.

14. The textile composite of claim 13 wherein said polyurethane film comprises an aromatic polyether.

15. The textile composite of claim 13 wherein said polyurethane film has a thickness of about 5 mils or less.

16. The textile composite of claim 1 wherein said adhesive layer comprises a heat-activated, polyester adhesive.

17. The textile composite of claim 1 wherein said composite further comprises a fluorochemical coating upon said first side of said nonwoven needled layer.

18. The textile composite of claim 1 wherein said polymeric film layer comprises a halogenated aromatic polyether.

19. The textile composite of claim 12 wherein said polyester adhesive exhibits a melting point of about 200 degrees Fahrenheit or greater.

20. A textile comprising:
(a) a nonwoven needled layer, said nonwoven needled layer being comprised of fibers, said nonwoven needled layer having a first pile-containing side and a second side opposite said first pile-containing side;
(b) a binder material applied to said second side of said nonwoven needled layer, said binder material comprising an acrylic latex binder,
(c) a polyester-based adhesive layer adjacent said second side of said nonwoven needled layer; and
(d) a flame retardant polyurethane-based film layer bonded by said adhesive layer to said nonwoven needled layer, said polyurethane-based film layer comprising an aromatic polyether.

21. The textile of claim 20 wherein said nonwoven needled layer further comprises a fluorochemical coating upon said first pile-containing side.

22. The textile of claim 21 wherein said fluorochemical coating comprises a fluorine-containing hydrocarbon which is adapted for repelling moisture and release of stains from said pile-containing side of said nonwoven needled layer.

23. A layered textile composite, the composite comprising:
(a) a nonwoven needled layer, said nonwoven needled layer being comprised of fibers, said nonwoven needled layer having a first side with a flat felt texture, and a second side;
(b) a binder material applied only to said second side of said nonwoven needled layer, said binder material comprising an acrylic latex binder,
(c) an adhesive layer adjacent said second side of said nonwoven needled layer; and
(d) a polymeric film layer bonded to said adhesive layer.

24. The textile composite of claim 23 wherein said fibers are selected from the group consisting of polyester fibers, polypropylene fibers, and mixtures thereof.

25. The textile composite of claim 23 wherein said fibers comprise polyester fibers.

26. The textile composite of claim 23 wherein said fibers comprise polypropylene fibers.

27. The textile composite of claim 23 wherein said fibers comprise a blend of polyester and polypropylene fibers.

28. The textile composite of claim 23 in which the weight of the nonwoven needled layer is between about 5 and about 20 ounces per square yard.

29. The textile composite of claim 23 wherein said binder material further comprises a flame retardant composition.

30. The textile composite of claim 29 wherein said flame retardant composition is provided in said nonwoven needled textile at a concentration of between about 1 and about 12 ounces per square yard.

31. The textile composite of claim 23 in which said synthetic fibers contain a flame retardant material.

32. The textile composite of claim 31 wherein said flame retardant material comprises a bromine-containing composition.

33. The textile composite of claim 31 wherein said flame retardant material comprises a phosphorous-containing composition.

34. The textile composite of claim 23 wherein said adhesive layer comprises a polyester adhesive.

35. The textile composite of claim 23 wherein said polymeric film comprises a polyurethane film.

36. The textile composite of claim 35 wherein said polyurethane film comprises an aromatic polyether.

* * * * *